(12) United States Patent
Dono et al.

(10) Patent No.: US 7,237,101 B1
(45) Date of Patent: Jun. 26, 2007

(54) METHODS AND APPARATUS FOR SELF DESCRIBING DEVICES

(75) Inventors: Nicholas R. Dono, Hopewell Junction, NY (US); Bengt-Olaf Schneider, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,067

(22) Filed: Feb. 12, 2000

(51) Int. Cl.
*G06F 9/00* (2006.01)

(52) U.S. Cl. .......................................... 713/1; 713/100
(58) Field of Classification Search ...................... 713/1
See application file for complete search history.

(56) References Cited

U.S. PATENT DOCUMENTS

| | | | | |
|---|---|---|---|---|
| 4,589,063 A | * | 5/1986 | Shah et al. ..................... | 710/8 |
| 5,752,042 A | * | 5/1998 | Cole et al. .................. | 717/173 |
| 5,809,303 A | * | 9/1998 | Senator ....................... | 719/325 |
| 6,009,480 A | * | 12/1999 | Pleso ........................... | 710/8 |
| 6,041,360 A | * | 3/2000 | Himmel et al. ............. | 709/245 |
| 6,167,567 A | * | 12/2000 | Chiles et al. ................ | 717/173 |
| 6,202,210 B1 | * | 3/2001 | Ludtke ........................ | 709/224 |
| 6,219,703 B1 | * | 4/2001 | Nguyen et al. ............. | 709/224 |
| 6,308,326 B1 | * | 10/2001 | Murphy et al. ............. | 717/174 |
| 6,393,492 B1 | * | 5/2002 | Cornaby et al. ............ | 719/321 |
| 6,421,069 B1 | * | 7/2002 | Ludtke et al. ............... | 345/762 |
| 6,578,069 B1 | * | 6/2003 | Hopmann et al. .......... | 709/203 |
| 6,578,142 B1 | * | 6/2003 | Anderson et al. ............. | 713/2 |
| 6,607,314 B1 | * | 8/2003 | McCannon et al. ........... | 400/62 |

FOREIGN PATENT DOCUMENTS

JP 01201755 A * 8/1989

OTHER PUBLICATIONS

"Medium Self-Description for Removable Medium Devices". IBM Technical Disclosure Bulletin. Nov. 1994. vol. 37 Issue 11. pp. 139-146.*

* cited by examiner

*Primary Examiner*—Rehana Perveen
*Assistant Examiner*—Eric Chang
(74) *Attorney, Agent, or Firm*—Ference & Associates LLC

(57) ABSTRACT

Methods and arrangements for facilitating the integration of devices, such as hardware components, with a computer operating system or the like. Contemplated herein are self-describing devices that serve to eliminate one or more intermediate steps commonly encountered heretofore.

29 Claims, 2 Drawing Sheets

METHODS AND APPARATUS FOR SELF DESCRIBING DEVICES

FIELD OF THE INVENTION

The present invention generally relates to devices, such as hardware components, for being integrated with a computer system and arrangements and methods for integrating such devices with a computer system.

BACKGROUND OF THE INVENTION

In the context of many known operating systems, it is possible to integrate different devices, such as hardware components, with the operating system through device drivers. Device drivers are low-level software programs that translate abstract device commands, as specified in the operating system's device interface, into actual commands issued to the hardware device.

One problem commonly encountered is that device drivers must be updated in order to eliminate bugs, to improve the performance of the integrated device or to enhance the functionality of the device. The updating of device drivers is typically accomplished by obtaining a new device driver from the device manufacturer, e.g., on a storage device such as a diskette or CD-ROM or via the downloading of one or more device driver files from the manufacturer's web site.

In the realm of software, as well, certain arrangements for updating are known. Examples include Intuit's "TURBO TAX", where the software periodically queries the user whether to check the Intuit web page for updated versions of the software and/or newer versions of the tax forms. With Norton's "ANTIVIRUS", the software periodically checks whether updated virus signature files are available on the company web site. With the IBM "GLOBAL NETWORK DIALER", when there is a connection to the internet, the software determines whether a newer version of the software and/or a newer version of the phone number list is available and asks the user whether to update.

None of the software programs just described, however, implement the concept of storing the necessary software components within a physical device itself Furthermore, all of the programs in question rely on proprietary solutions to implement the function of automatic updates, instead of using a common protocol to test and update existing versions of the software.

To a degree, dynamic reconfiguration is available today (e.g., plug 'n' play of PC-cards) and will likely become more widespread over the next few years. However, when integrating new devices into a computer system one or more of the following problems often occurs:

operating system does not know the type of device and does not have the proper device driver file or files.

Although the operating system knows about the device, the device driver is not available on the system and must be loaded from the operating system's install medium (e.g., tape, diskette, CD-ROM)

The operating system knows the device but a back-level (old) version of the device driver is available within the system.

In view of the foregoing, a need has been recognized in connection with providing arrangements and methods for more efficiently configuring a computer system with new hardware components.

SUMMARY OF THE INVENTION

The present invention, in accordance with at least one presently preferred embodiment, overcomes the disadvantages and shortcomings of previous efforts by storing the device driver on the device itself from where it can be loaded by the operating system.

Preferably, the information stored on the device will have at least the following three components:

A description of the device through a unique ID and some textual, human-readable description.

The device driver file(s) with version numbers.

Information on how to obtain newer versions of the device driver, e.g., a URL.

Preferably, the aforementioned information will be exchanged over a common protocol supported by the operating system and all such devices.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
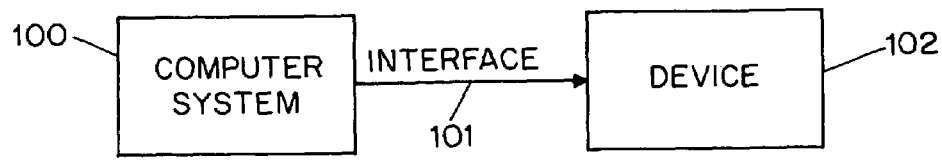
FIG. 1 schematically illustrates a computer system with attached device.

FIG. 1 shows a schematic high-level view of a computer system 100 with an attached device 102. The device 102 is connected to the computer system 100 via an interface 101. For example, the device 102 can be a graphics adapter or a disk drive and the interface can be a PCI bus or an IDE connection. Essentially, device 102 could be any component originally separate from computer system 100 that is to be subsequently integrated with the computer system 100 and for which, conventionally, a rather involved installation procedure may be required. Thus, for instance, device 102 could also be a modem, a printer, a sound card, a video card, a graphics card, a DE or SCSI adapter, a network interface card, a network controller, a CD ROM drive, or a tape drive.

Figure 2:
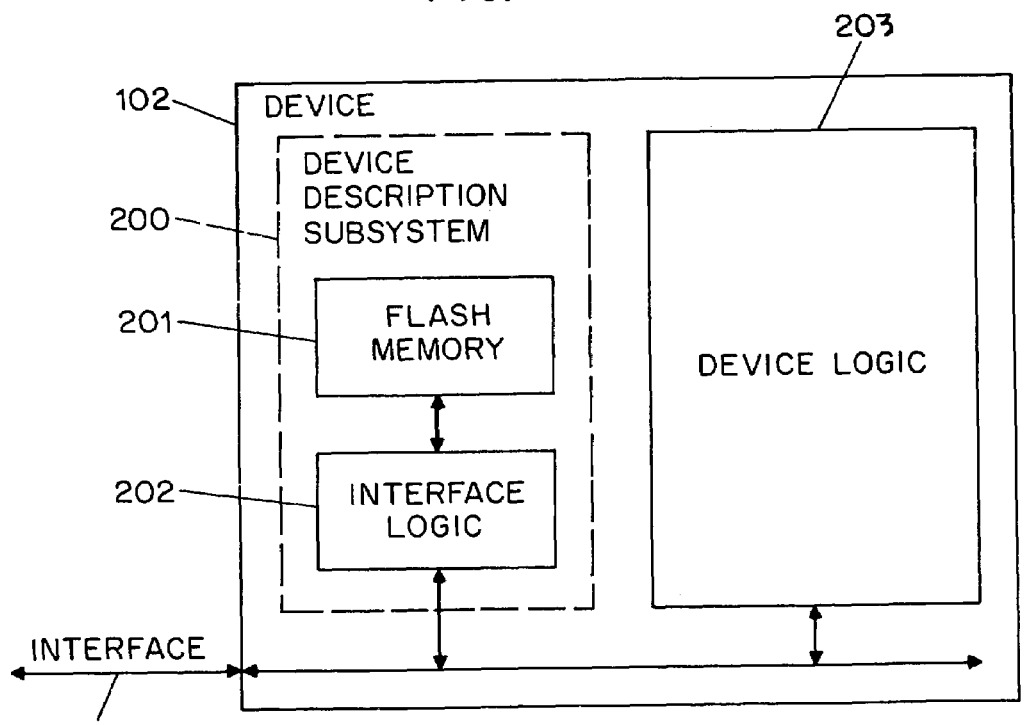
FIG. 2 schematically illustrates the internal structure of a device.

In FIG. 2, the internal structure of the device 102 is schematically shown. Preferably, in addition to the actual functioning components of the device, e.g., device logic, depicted by block 203, there is also a device description subsystem 200. This subsystem 200 preferably includes two main parts: a non-volatile, read-write memory 201 and interface logic 202. The interface logic 202 interprets commands received over the computer-device interface 101 and controls the non-volatile memory 201, which contains the locally stored device driver.

The commands understood by the interface logic 202 preferably support the following functions:

I. Device Identification: This function returns a unique identifier and a textual device name. The identifier allows the computer system and its operating system to positively identify the device. The name can be used by the operating system to present to the user the device(s) attached to the computer system.

II. Device Driver Versions: This function returns version information about the device driver stored on the device. Versions are defined e.g., by a triplet of numbers that indicate major version, minor version and release number.

III. Read Device Drivers: This function allows the operating system to obtain a copy of the device driver for installation.

IV Get Link to Device Driver Data: This function provides a reference to a network location, e.g., a URL, where the most recent version of the device driver can be found.

V. Update Device Drivers: This function allows updating the device driver information stored on the device with a more recent version.

VI. Update Link: This function allows to update the location of where to find the latest version of a given device driver. (Preferably, the device manufacturer will maintain such locations with care in order not to send queries to non-existing sites.)

Figure 3:
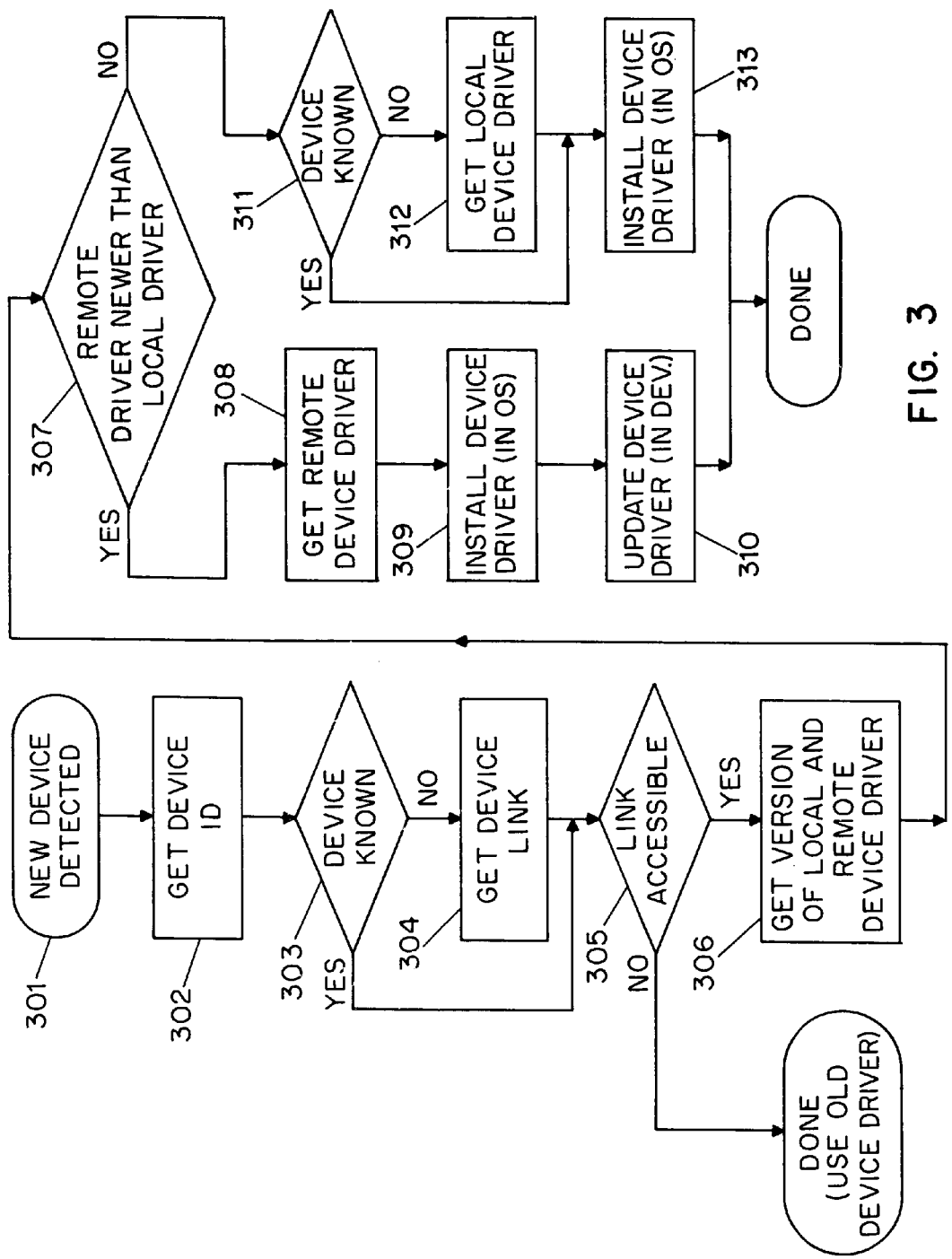
FIG. 3 illustrates a flow diagram that sets forth a protocol for integrating a device with an operating system.

FIG. 3 is a flow diagram that illustrates how the operating system interacts with the device in accordance with an embodiment of the present invention. If the computer system detects a new device (step 301) through essentially any suitable known method, it first determines the device identification (302). Based on the device identification, the operating system can decide whether this device is already known (303). If not, it retrieves the link from the device (304); otherwise that link is already known. Then, a test (305) is performed to determine whether the link is accessible; e.g., if the computer system is not attached to a network a URL cannot be resolved. If the link is not accessible, then the existing local device driver ("old" device driver) will be used. If the link is accessible, however, the available (local) driver version is tested against the remote version to find out whether a more recent one is available (307). The newer one of the remote and local version is then installed by the operating system [OS] (309, 313) and if necessary downloaded into the device (310).

Figure 4:
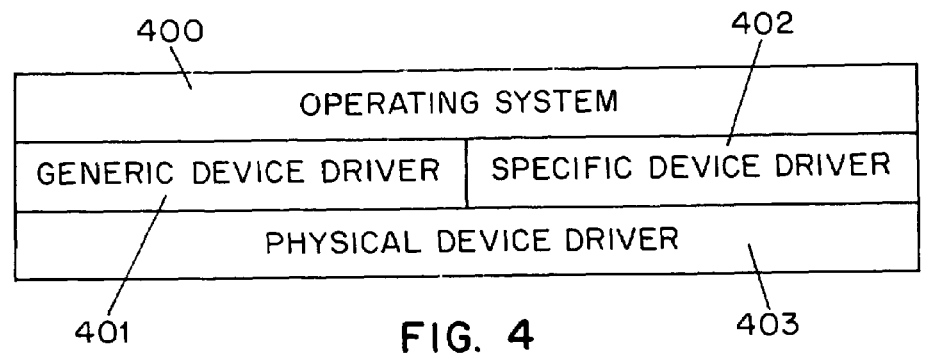
FIG. 4 schematically illustrates the integration of a device with into typical device driver stacks.

FIG. 4 shows how device driver stacks, as they are presently used in many operating systems (e.g., Microsoft Windows), can integrate a device description arrangement in accordance with at least one embodiment of the present invention. The physical device drivers (403), e.g., a PCI (peripheral component interconnect) bus driver or a SCSI (small computer system interface) driver is accessed by two higher-level drivers. The device-specific driver 402 is the standard device driver that addresses the actual function of the device. The generic device driver 401 in conjunction with the operating system 400 implements the algorithm of FIG. 3 described above.

Several practical scenarios can help illustrate the advantages that may be enjoyed in connection with a device describing arrangement provided and utilized in accordance with at least one embodiment of the present invention. For instance, if a device is connected to a stand-alone (i.e., not network connected) computer system, then the device driver can be loaded directly and automatically from the device without the need to find the OS installation CD.

If a device is connected to a network-connected computer, then the most recent device driver can be retrieved from the location stored on the device. If the latest device driver is already stored on the device, no lengthy download over the network is required as the device driver is retrieved directly from the device.

As another advantage, the device driver on a device can be updated with a newer driver from the network on a network-connected computer or from other media like a CD-ROM or diskette.

A device description arrangement, in accordance with at least one alternative embodiment of the present invention, can be used to configure any network devices or resources and install the necessary drivers. Such network devices or resources may include printers, fax machines, and scanners. In this case, the necessary drivers are stored inside the device or resource. Upon request or automatically, the computer system enumerates all the network devices or resources available locally and within a network neighborhood (e.g., on the same subnet or ring). All such network devices or resources would thus be automatically installed and made available to the user.

As a variation on the process described above and shown in FIG. 3, a computer system may periodically check the currently installed driver against the version available on the remote site. If a newer driver is detected, it is downloaded, installed and updated on the device. The predetermined time intervals at which such periodic checking may take place can be chosen depending on the volatility associated with the driver in question. For example, it is conceivable to check for new versions of graphics and network card drivers at significantly frequent intervals, in view of the fact that these are typically updated quite often, while versions of printer drivers, on the other hand, might not need to be checked upon quite so frequently since these do not tend to be updated very often.

A further variation on the basic algorithm described above and shown in FIG. 3 resides in querying the user as to whether to download a new driver in cases of a low-bandwidth connection (e.g., phone line). The user may then decide to defer the download to a time when a better connection becomes available.

The process described and illustrated heretofore with respect to FIG. 3 can be applicable both to cold-plugging (before power-on) and to hot-plugging (during operation) of new devices.

At least one presently preferred embodiment of the present invention broadly contemplates the installation of drivers over networks. Particularly, instead of storing the actual driver with the device, the device might only store a reference to a network location where to find the driver. For instance, for the purpose of facilitating integration with an operating system, a printer may have nothing more than an internet address that holds different printer drivers. The advantage of this setup is that it eliminates the need for checking the device driver version stored on the device and then conditionally updating it from the web. Instead, the most recent version would always be retrieved from the web. In this connection, less storage would be required on the device, the possibility would arise of setting up a website with company-specific drivers, and the maintenance of devices would be easier (since there is only one location holding drivers).

It is to be understood that the present invention, in accordance with at least one presently preferred embodiment, includes an arrangement, inherent to a device, for facilitating the integration of the device with a computer operating system. The arrangement may be implemented in conjunction with at least one general-purpose computer running suitable software programs. It may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A self-describing peripheral device for being integrated with a computer operating system, said device comprising:
    at least one hardware component resident in said device;
    at least one description subsystem resident in said device and associated with said at least one hardware component;
    said at least one description subsystem being adapted to facilitate integration of said device with a computer operating system;
    said at least one description subsystem comprising interface logic for interpreting commands received over an interface between said device and a computer operating system, wherein said interface logic is adapted to determine if said device is know to said operating system, and if said device is not known to said operating system, provide a reference to a network location where a recent version of a device driver is obtainable;
    said interface logic is further adapted to assist said computer operating system in obtaining a copy of the device driver for installation in said device; and
    wherein the currency of said installed device driver is periodically checked based upon the volatility of said driver and if a more recent device driver is available, said more recent device driver is installed in said device.

2. The device according to claim 1, further comprising:
    non-volatile memory;
    said interface logic being adapted to control said non-volatile memory.

3. The device according to claim 1, wherein said interface logic is adapted to facilitate identification of said device.

4. The device according to claim 1, further comprising:
    a device driver;
    said interface logic being adapted to facilitate the provision of information to a computer operating system relating to the version of said device driver.

5. The device according to claim 1, wherein said interface logic is adapted to facilitate the updating of a network location at which a recent version of a device driver is obtainable.

6. The device according to claim 1, wherein said interface logic is adapted to facilitate the updating of device driver information stored on said device.

7. The device according to claim 1, further comprising:
    a locally stored device driver, stored on said device;
    said interface logic being adapted to compare said locally stored device driver with a remotely stored device driver so as to determine which of said device drivers is of a newer version and to prompt usage of the newer version.

8. The device according to claim 1, further comprising:
    a locally stored device driver, stored on said device;
    said interface logic being adapted to prompt usage of said locally stored device driver if a remotely stored device driver is not accessible.

9. The device according to claim 1, further comprising:
    a locally stored device driver, stored on said device;
    said interface logic being adapted to compare said locally stored device driver with a remotely stored device driver at predetermined time intervals so as to determine which of said device drivers is of a newer version.

10. The device according to claim 1, wherein said device comprises a printer.

11. The device according to claim 1, wherein said device comprises a modem.

12. The device according to claim 1, wherein said device comprises a graphics card.

13. The device according to claim 1, wherein said device comprises a sound card.

14. The device according to claim 1, wherein said device comprises a IDE disk controller.

15. The device according to claim 1, wherein said device comprises a SCSI disk controller.

16. The device according to claim 1, wherein said device comprises a network controller.

17. The device according to claim 1, further comprising:
    said interface logic is further adapted to query a computer user whether to initiate a low-bandwidth transfer of the device driver upon recognition of a low-bandwidth connection.

18. A method of integrating a self-describing peripheral device with a computer operating system, said device comprising:
    providing at least one hardware component to be resident in said device;
    providing at least one description subsystem to be resident in said device and associated with said at least one hardware component;
    adapting said at least one description subsystem to facilitate integration of said device with a computer operating system, said at least one description subsystem comprising interface logic for interpreting commands received over an interface between said device and a computer operating system;
    facilitating integration of said device with a computer operating system via said at least one description subsystem, wherein said facilitating of integration comprises determining if said device is know to said operating system, and if said device is not known to said operating system, providing a reference to a network location where a recent version of a device driver is obtainable and assisting said computer operating system in obtaining a copy of the device driver for installation in said device; and
    wherein the currency of said installed device driver is periodically checked based upon the volatility of said driver and if a more recent device driver is available, said more recent device driver is installed in said device.

19. The method according to claim 18, wherein said facilitating of integration comprises facilitating identification of said device.

20. The method according to claim 18, further comprising:
  providing a device driver associated with said device;
  said facilitating of integration comprising facilitating the provision of information to a computer operating system relating to the version of said device driver.

21. The method according to claim 18, wherein said facilitating of integration comprises the updating of a network location at which a recent version of a device driver is obtainable.

22. The method according to claim 18, wherein said facilitating of integration comprises facilitating the updating of device driver information stored on said device.

23. The method according to claim 18, further comprising:
  storing a device driver locally on said device;
  said facilitating of integration comprising comparing said locally stored device driver with a remotely stored device driver so as to determine which of said device drivers is of a newer version and to prompt usage of the newer version.

24. The method according to claim 18, further comprising:
  storing a device driver locally on said device;
  said facilitating of integration comprising prompting usage of said locally stored device driver if a remotely stored device driver is not accessible.

25. The method according to claim 18, further comprising:
  storing a device driver locally on said device;
  said facilitating of integration comprising comparing said locally stored device driver with a remotely stored device driver at predetermined time intervals so as to determine which of said device drivers is of a newer version.

26. The method according to claim 18, further comprising:
  storing a device driver locally on said device;
  said facilitating of integration comprising comparing said locally stored device driver with a remotely stored device driver so as to determine which of said device drivers is of a newer version and querying a user to choose between versions.

27. The method according to claim 18, wherein said interface logic is further adapted to query a computer user whether to initiate a low-bandwidth transfer of the device driver upon recognition of a low-bandwidth connection.

28. A program storage device readable by machine, tangibly embodying a program of instructions executable by the machine to perform method steps for:
  providing at least one hardware component to be resident in said device;
  providing at least one description subsystem to be resident in said device and associated with said at least one hardware component;
  adapting said at least one description subsystem to facilitate integration of said device with a computer operating system, said at least one description subsystem comprising interface logic for interpreting commands received over an interface between said device and a computer operating system;
  facilitating integration of said device with a computer operating system via said at least one description subsystem, wherein said facilitating of integration comprises determining if said device is know to said operating system, and if said device is not known to said operating system, providing a reference to a network location where a recent version of a device driver is obtainable and wherein said interface logic is farther adapted to assist said computer operating system in obtaining a copy of the device driver for installation in said device; and
  wherein the currency of said installed device driver is periodically checked based upon the volatility of said driver and if a more recent device driver is available, said more recent device driver is installed in said device.

29. The program storage device according to claim 28, wherein said interface logic is further adapted to query a computer user whether to initiate a low-bandwidth transfer of the device driver upon recognition of a low-bandwidth connection.

* * * * *